United States Patent [19]
Halstead

[11] Patent Number: 5,896,497
[45] Date of Patent: Apr. 20, 1999

[54] SYSTEM FOR SECURING A COMPUTER

[76] Inventor: William D. Halstead, 1003 Heathrow Hills Ct., Brentwood, Tenn. 37027

[21] Appl. No.: 08/691,025

[22] Filed: Aug. 7, 1996

[51] Int. Cl.$^6$ .............................. H04K 1/00; H04L 27/10
[52] U.S. Cl. .................. 395/186; 395/187.01; 395/188.01
[58] Field of Search .......................... 395/186, 187.01, 395/188.01; 380/25, 4, 23; 340/825.34, 825

[56] References Cited

U.S. PATENT DOCUMENTS

| | | | |
|---|---|---|---|
| 4,519,036 | 5/1985 | Green | 364/200 |
| 4,531,023 | 7/1985 | Levine | 379/95 |
| 4,604,708 | 8/1986 | Lewis | 364/900 |
| 4,779,224 | 10/1988 | Moseley et al. | 364/900 |
| 4,800,590 | 1/1989 | Vaughn | 380/25 |
| 4,866,771 | 9/1989 | Baine | 380/23 |
| 4,959,860 | 9/1990 | Watters et al. | 380/4 |
| 4,962,449 | 10/1990 | Schusinger | 364/200 |
| 4,999,621 | 3/1991 | Loeb | 340/825.34 |
| 5,146,499 | 9/1992 | Geffrorin | 380/23 |
| 5,323,146 | 6/1994 | Glaschick | 340/825 |
| 5,355,484 | 10/1994 | Record et al. | 395/650 |
| 5,375,243 | 12/1994 | Parzych et al. | 395/725 |
| 5,406,261 | 4/1995 | Glenn | 340/571 |
| 5,432,715 | 7/1995 | Shigematsu et al. | 364/551.01 |
| 5,469,564 | 11/1995 | Junya | 395/188 |
| 5,483,244 | 1/1996 | Grube et al. | 342/463 |
| 5,485,622 | 1/1996 | Yamaki | 395/186 |
| 5,497,421 | 3/1996 | Kaufman et al. | 380/23 |
| 5,533,125 | 7/1996 | Bensimon et al. | 380/4 |

OTHER PUBLICATIONS

"Security Laptop Locator", Newsweek, Nov. 24, 1997.

*Primary Examiner*—Ly V. Hua
*Attorney, Agent, or Firm*—Waddey & Patterson; Edward D. Lanquist, Jr.

[57] ABSTRACT

The present invention discloses a system and method for securing a computer. This system detects an event such as said number of key strokes or a mouse click. This systems reads for the presence or absence of an unprompted password prior to detecting the event. If the proper password is provided, the system is deactivated. If the appropriate password is not provided, a monitoring computer is notified of the unauthorized use of the protected computer. In notifying a monitoring computer, the system turns off the speaker of the modem so that the monitoring computer can be notified without alerting the unauthorized user. When the proper password is not provided, the system also notifies the monitoring computer so that the monitoring computer can check the unique identifying number of the protected computer. The location of that protected computer can then be traced. Therefore, if the protected computer is lost or stolen, the location can be communicated to an individual, such as the protected computer's owner, in a very short period of time to allow recovery of the protected computer. Additionally, the monitoring computer also notifies an individual, such as the computer's owner, of the unauthorized use of the protected computer. Also, the system, if the proper password is not provided, prevents the transmission of data via the modem.

20 Claims, 2 Drawing Sheets

1

SYSTEM FOR SECURING A COMPUTER

BACKGROUND OF THE INVENTION

The present invention relates generally to a system for securing a computer and more particularly to a system which reports unauthorized access to a computer, prevents transmission of that computer's data through the modem, and traces the location of the computer.

It will be appreciated by those skilled in the art that the transmission and storage of information is becoming more and more critical. This transmission of information has been enabled by the development of computers. As such, computers are worth vast amounts of money. Often times, the information contained on a computer can be worth much more than the computer itself. As a result, the need to secure a computer is increasing all the time.

The need to secure a computer is the need to secure both the electronic information on the computer as well as the computer itself. The unauthorized access to a computer should be reported. Unauthorized users should not be able to transmit the computer's data across its modem. The location of the computer should be reported so that lost or stolen computers can be found.

To this end, there have been several attempts to secure computers, one of the most common of which is the use of a simple password. The system prompts the individual for a password. However, many programs exist which "bulldoze" through a prompted password system. Additionally, a password system does little good for a stolen computer and does not report the location of the computer. Additionally, a password type system does not notify individuals of unauthorized access to the computer prior to entry. The use of common networks that can be accessed across the country by a corporate employee makes the need for more security more important.

What is needed, then, is a system which requires a password be entered prior to the undertaking of certain events such as a number of key strokes or a mouse click. This needed system must require an unprompted password. This needed system must secretly notify said individual, such as the computer's owner, of the unauthorized access to the computer. This needed system must operate ordinarily during unauthorized access to avoid alerting the unauthorized user that he or she is being traced and/or reported. This needed system must prevent data transmission during unauthorized access. This needed system must also notify the legitimate owner of the computer (or his designee) of the location of a lost or stolen computer. This needed system is presently lacking in the prior art.

SUMMARY OF THE INVENTION

The present invention discloses a system and method for securing a computer. This system detects an event such as said number of key strokes or a mouse click. This systems reads for the presence or absence of an unprompted password prior to detecting the event.

If the proper password is provided, the program allows the computer to be used normally. If the appropriate password is not provided, the system turns off the modem's speakers then notifies a monitoring computer that an unauthorized person is using the protected computer without alerting the unauthorized user. However, even if the password is not given, the operating system will continue to function so that the unauthorized user is not alerted. When the protected computer notifies the monitoring computer, the protected computer's unique identifying number is transmitted, thereby positively identifying the protected computer. The monitoring computer server contains software which identifies the location of the protected computer. Therefore, if the protected computer is lost or stolen, the location can be communicated to an individual, such as the computer's owner, in a very short period of time to allow recovery of the protected computer. Additionally, the system occupies the communications port of the protected computer and prevents any data transmission, via the modem, from the protected computer.

Accordingly, one object of the present invention is to provide a system for securing a computer.

Another object of the present invention is to provide a system which requires an unprompted password prior to a certain event.

Another object of the present invention is to provide a system which notifies a monitoring computer of the absence of the required password.

Another object of the present invention is to provide a system which deactivates or masks the speaker of the modem so that a monitoring computer can be notified of an unauthorized user without alerting the unauthorized user.

Another object of the present invention is to provide a system for checking the unique identifying number of the protected computer and tracing the location of the protected computer.

Another object of the present invention is to provide a system which notifies the owner of the protected computer of the location of the lost or stolen protected computer.

Another object of the present invention is to "block" the modem from transmitting the protected computer's data by an unauthorized user.

DESCRIPTION OF THE PREFERRED EMBODIMENT

Figure 1:
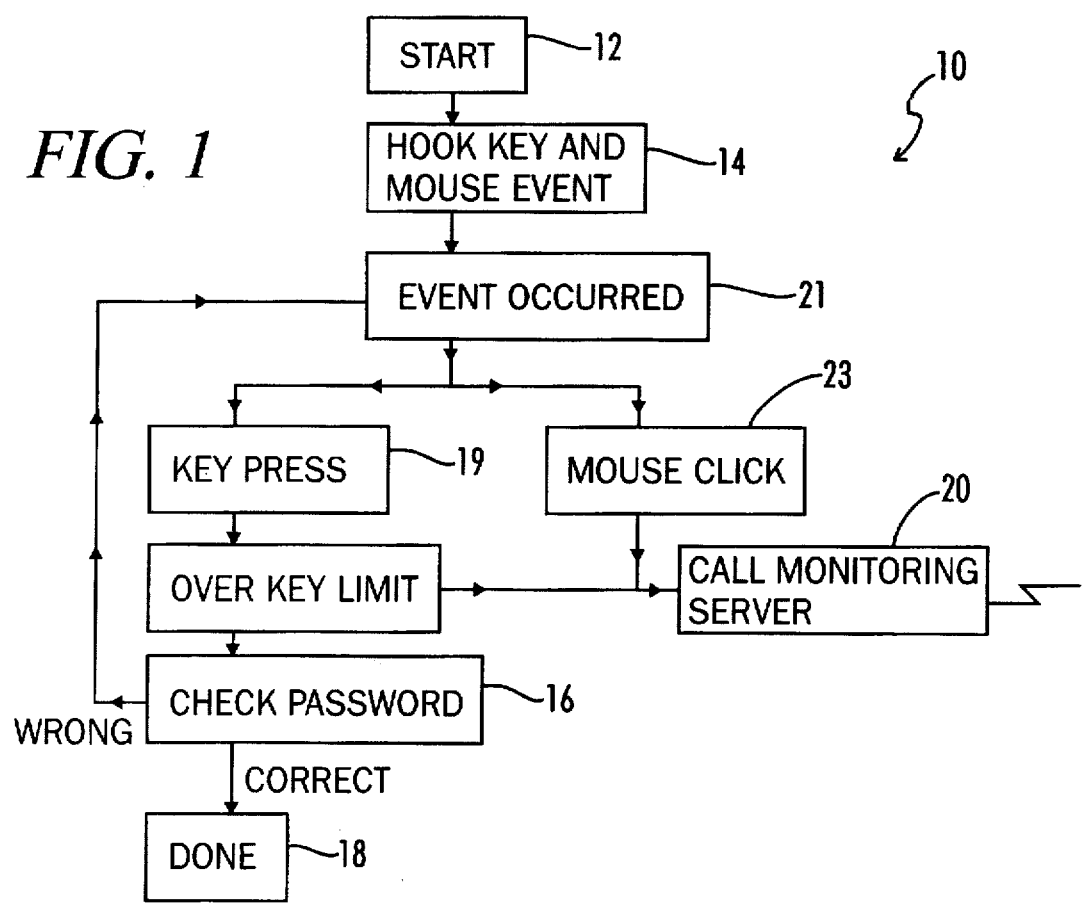
FIG. 1 is a flow chart showing the operation of the protected computer of the system of the present invention.
Figure 3:
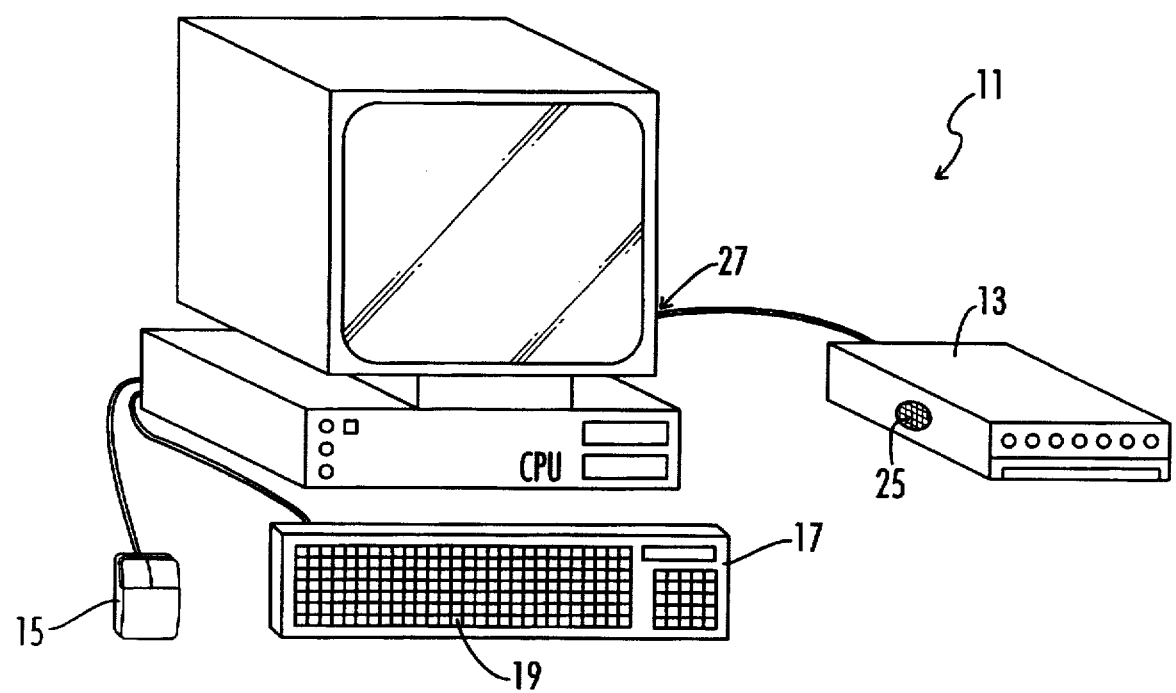
FIG. 3 is a drawing of the protected computer.

Referring now to FIGS. 1 and 3, there is shown generally at 11 the transmitting portion of system for securing a computer 10. The transmitting portion consists of a standard personal computer 11 having modem 13. Start block 12 signifies the step of turning on the computer and loading the operating system. In hook key and mouse event 14, the system detects an event which is preferably to either the click of mouse 15 or the pressing a certain number of keys 19 of key board 17 to the invention. When an event 21 occurs, the system reads for a password. Prior to clicking a mouse 23 or pressing a certain number of keys 19, system 10 reads for the presence or absence of a password as shown in block 16. Preferably, the presence or absence of a password is checked prior to a mouse click or prior to the pressing a predetermined number of keys. In the preferred embodiment, the password sought is unprompted by the system thereby precluding an unauthorized user from using a "bulldozer" program. If the system reads the presence of a password prior to detecting an event, the system is completed and the program is deactivated as shown in block 18. If the password is not entered prior to the event, the monitoring service is notified using the protected computer's modem as shown in block 20. Prior to notifying the monitoring computer, speaker 25 on the modem 13 is turned off. Additionally, communications port 27 of computer 11 is disabled or occupied for any other purpose. Although preferably, the modem of the preferred embodiment is a standard telephone modem, the system would also work very well with a cellular modem or any other type of remote communications device.

Figure 2:
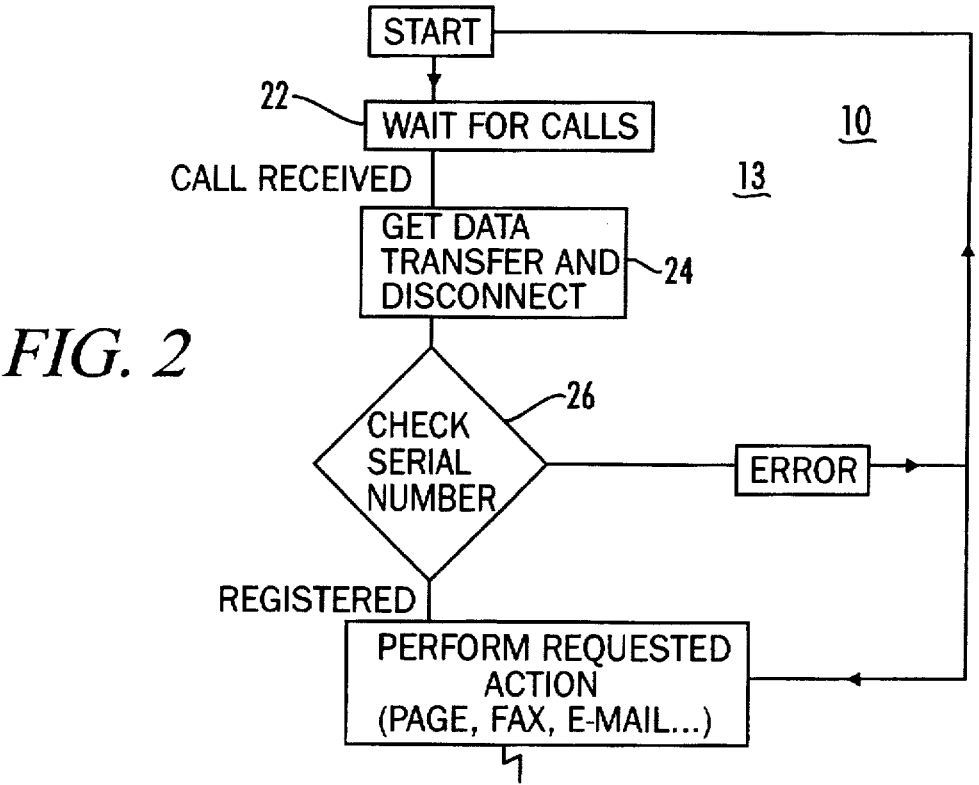
FIG. 2 is a flow chart of the monitoring computer of the system of the present invention.

Referring now to FIG. 2, there is shown generally at 13 the monitoring or receiving computer of system 10 of the present invention. Monitoring computer 13 waits for a call (20 in FIG. 1) as shown in block 22. When a call is received, all relevant data is transferred from the protected computer as shown in block 24. This information is the protected computer's unique identifying number and any other necessary information from the protected computer 11. System 10 then checks the unique identifying number against a database of unique identifying numbers. As shown in block 26, if the unique identifying number is unregistered, then an error message is sent and the monitoring computer 13 begins this loop again. When a registered unique identifying number is received, the monitoring computer 13 performs certain steps such as tracing the location of the protected computer and notifies the owner or authorized user of the transmitting computer of the unauthorized use either through a page, telecopier transmission, e-mail, or any other communication system selected by the legitimate owner as shown in block 29. If the computer is not registered then error message is sent as shown in block 31.

In the preferred embodiment, the system will require the authorized user to load or select certain information such as his or her name, address, password, method of notification or other unique identifying information during the registration of the system with the central computer. The system can then give the authorized user the right to be prompted or not to be prompted for the necessary password.

As an additional subtling feature of the present invention, the protected computer can continue to be used during the notification process so that the unauthorized user is unaware that the notification process is occurring.

The monitoring computer can also use ANI, which is a type of nationwide caller identification to determine the address from which the call is made and at which the lost or stolen protected computer resides. Eventually, as cellular modems become more popular, the location of computers using existing cellular location technology can be determined.

During an unauthorized use, the communications port of the protected computer is "locked" by the system which will preclude any data transfer by the modem.

In the event that the protected computer is not connected to a phone line, the program, once activated, will continue to subtly search for a connection. As soon as the system receives a phone line, the silent call is made to the monitoring computer to initiate the notification process.

Portable computers, laptops, and notebooks will not be able to access any programs requiring the modem after an unauthorized use. This will prevent access to corporate and personal local area networks, Intranets, or e-mail.

An initial feature of the program will be to provide the ability for updates to the program to be provided to the user at selected intervals. The updates will allow expiration of the password after a predetermined time if the update is not installed. In other words, the program will call the monitoring service if the update has not been installed even if the password has been entered. This feature will be useful in corporations that are potentially concerned about internal theft of hardware.

Thus, although there have been described particular embodiments of the present invention of a new and useful system for securing a computer, it is not intended that such references be construed as limitations upon the scope of this invention except as set forth in the following claims. Further, although there have been described certain dimensions used in the preferred embodiment, it is not intended that such dimensions be construed as limitations upon the scope of this invention except as set forth in the following claims.

What I claim is:

1. A method of securing a computer comprising:
   a. detecting an event;
   b. reading a presence or an absence of a password prior to detecting said event; and
   c. notifying a monitoring computer after reading the absence of said password.

2. The method of claim 1 wherein said step of reading of a presence or an absence of a password occurs without a prompt by said computer.

3. The method of claim 1 further comprising the step of blocking a communication port of said computer in said absence of said password.

4. The method of claim 1 wherein said monitoring computer is notified using a modem.

5. The method of claim 1 further comprising the step of silencing a speaker of a modem prior to notifying said monitoring computer.

6. The method of claim 1 further comprising the step of checking a unique identifying number of said computer by said monitoring computer.

7. The method of claim 1 further comprising the step of reporting by the protected computer said absence of said password to said monitoring computer.

8. The method of claim 7 further comprising the step of warning an individual of said absence of said password by said monitoring computer.

9. The method of claim 1 further comprising the step of tracing the location of said protected computer.

10. A system for securing a computer having a modem comprising:
    a. a transmitting or protected computer which reads a presence or an absence of a password prior to detecting an event,
       said transmitting or protected computer functions normally after reading the presence of said password, and
    b. a monitoring computer receiving information from said protected or transmitting computer after said protected computer reads the absence of said password.

11. The system of claim 10 wherein said protected computer reads said password without a prompt by said computer.

12. The system of claim 10 wherein said protected computer blocks a communication port of said computer in said absence of said password.

13. The system of claim 10 wherein said monitoring computer is notified using a modem.

14. The system of claim 10 wherein said protected computer silences a speaker of said modem prior to notifying said monitoring computer.

15. The system of claim 10 wherein said monitoring computer checks a unique identifying number of said protected computer.

16. The system of claim 10 wherein said protected computer notifies said absence of said password to said monitoring computer.

17. The system of claim 16 wherein said monitoring computer warns an individual of the unauthorized use of said protected computer.

18. The system of claim 10 wherein said monitoring computer traces the location of said protected computer.

19. A system for securing information comprising:
   a. a monitoring computer;
   b. a transmitting or protected computer containing said information, said protected computer preventing transmission of data without the necessary password, said protected computer communicating with said monitoring computer when said password is not provided; and
   c. said monitoring computer notifying an owner of said protected computer of unauthorized use of the protected computer.

20. The system of claim 19 wherein said monitoring computer traces the location of said protected computer in the absence of said password.

* * * * *